United States Patent [19]

Ramos

[11] Patent Number: 4,909,355
[45] Date of Patent: Mar. 20, 1990

[54] ENGINE OIL BIB

[76] Inventor: Craig J. Ramos, 17259 Via Annette, San Lorenzo, Calif. 94580

[21] Appl. No.: 383,711

[22] Filed: Jul. 24, 1989

[51] Int. Cl.$^4$ .............................................. F16N 31/00
[52] U.S. Cl. ................................. 184/106; 428/137; 123/196 R
[58] Field of Search ................... 184/106; 123/196 R; 428/137, 236, 519

[56] References Cited

U.S. PATENT DOCUMENTS

| | | | |
|---|---|---|---|
| 3,228,491 | 1/1966 | Gatsos | 184/106 |
| 3,316,995 | 5/1967 | Ray | 184/106 |
| 4,735,843 | 4/1988 | Noda | 428/137 |

Primary Examiner—Ira S. Lazarus
Assistant Examiner—Alan Cariaso
Attorney, Agent, or Firm—Linval B. Castle

[57] ABSTRACT

An oil absorbent bib to be suspended under an engine for preventing oil drip, the bib comprising a first layer of wire mesh for strength, a second layer of a pad that absorbs oil and oil based fuels, a third layer of a perforated neoprene and a fourth layer of neoprene sheet that holds water not absorbed in the second layer that may flow out between third and fourth layers. In the assembly of the bib provisions are made for adding a bib extension for extra long engines or mechanical devices that drip oil.

4 Claims, 1 Drawing Sheet

ENGINE OIL BIB

BRIEF SUMMARY OF THE INVENTION

This invention relates to the fabrication of mat or pads which, when suspended under an engine or the like, will absorb only oil and oil based fuels that may drip from the engine, and will pass water through the mat.

Many automobile, especially older or poorly maintained vehicles, develop a loose seal or an oil or fuel leak which, while not particularly important during travel, contributes to oil stained garage or carport floors and possible fire hazards. Such oil and fuel leaks in a boat with inboard engines will gather in the bilge and become a very dangerous hazard that could result in an explosion and fire.

It is contemplated that a vehicle oil bib made in accordance with tee invention could be made available at auto supply outlets and at the many high speed auto oil change depots where they could be removably strapped or wired beneath the engine so that they will prevent oil from dripping to the ground from the engine after an oil change. To accommodate both long and short engines, a standard size oil bib may be used with an added extension as needed. The oil bibs are flexible so that they can easily be maneuvered, without dripping absorbed oil or fuel, into and from positions between engine and bilges or auto body structural members.

The oil bib is constructed in several thin layers. The topmost layer into which an oil drip will first fall is merely a galvanized hardware cloth of approximately ¼" mesh to provide mechanical strength to the bib. Directly beneath the hardware cloth is a perforated sheet of "3M Oil Absorbent Pad" a commercially available proprietary material that absorbs oil and oil based fuel but rejects water. Oil soaks into the absorbent pad while water passes through the spaced open perforation in the pad to the third layer, a thin perforated sheet of neoprene. About one inch around the edges of the topmost layer of hardware cloth, it being about 2 inches larger in length and width than the absorbent pad and neoprene sheet, is now bent down and around the bottom of the neoprene sheet to form a flexible pad package that will pass water through the perforations but which will absorb oil and fuels. This flexible pad package is then placed on a solid or imperforated thin neoprene sheet and the resulting package is riveted together. While the pad package without the imperforated neoprene sheet will operate to separate water from absorbed oil, the addition of the second or imperforated neoprene sheet confines the water leakage to the edges of the pad and also provides a means for attaching an extension pad, as will be subsequently explained.

DESCRIPTION OF THE DRAWINGS

In the drawings which illustrate the preferred embodiment of the invention.

DETAILED DESCRIPTION

The oil bib to be described contains a layer of material that will absorb oil and oil based fuels such as gasoline and diesel fuel yet will reject water which may pass through the absorbent layer. As mentioned earlier, the bib suspended beneath an engine that drips oil is useful for maintaining a clean garage or carport floor and valuable for use under the engines in inboard boats for maintaining a clean bilge area.

Figure 1:
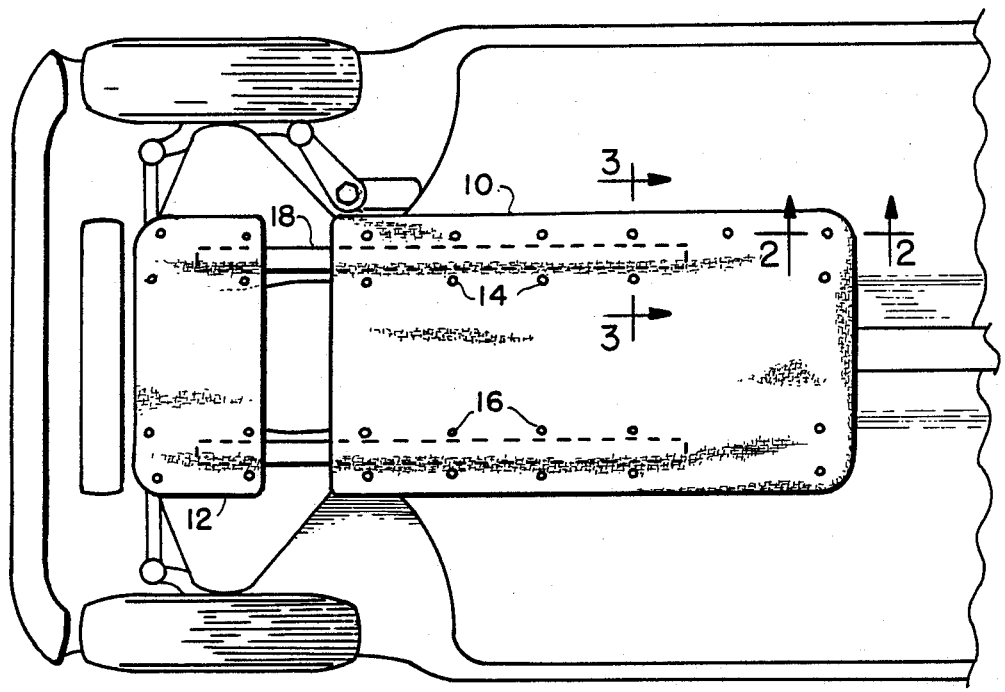
FIG. 1 is a bottom plan view of a portion of an automobile with an oil bib and bib extension suspended beneath the engine.

FIG. 1 illustrates an oil bib 10 suspended by wires or straps beneath the engine of an automobile. Normally, the bib will be positioned under any part of the engine or transmission from which oil leaks and, if a bib with a standard dimension of about one foot wide by two feet in length is inadequate to control oil dripping, an extension 12 of approximately 8-10 inches may be added.

It will be noted in FIG. 1 that the pads forming both the bib 10 and extension 12 are riveted together in two parallel paths 14, 16, each path comprised of two straight rows of rivets spaced about two inches. As will be subsequently described, a length of structural channel 18 slides between the rivet rows in each of the two paths and between layers in the bib so that the extension 12 may be secured to the bib 10 and be properly adjusted and positioned to catch oil not striking the bib.

Figure 2:
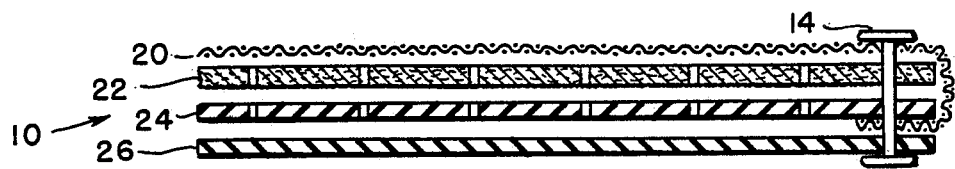
FIG. 2 is a sectional edge view of the oil bib taken along the lines 2—2 of FIG. 1.

FIG. 2 is a side elevational section of the bib taken along the lines 2—2 of FIG. 1 and illustrates the several layers forming the bib. The topmost layer 20 into which the oil from an engine first drops is hardware cloth, such as ¼" square mesh, which provides some mechanical strength to the bib. The second layer 22 is a perforated pad of a proprietary material that absorbs oil and oil based fuels but rejects water which passes through the small widely-spaced perforations and is not absorbed. This oil absorbent pad material is manufactured by 3M Company and is commercially available through such companies as The Crowley Environmental Services Corporation of Oakland, Calif.

Beneath the layer 22 is a perforated neoprene sheet 24 which effectively confines all absorbed oil in the layer 22 but permits water fluid to pass through the perforations. The bottom surface of the neoprene sheet 24 is therefore clean and substantially oil free. If desired, the pad comprising the hardware cloth layer 20, the absorbent layer 22 and the perforated neoprene sheet 24 may be used independently for an oil drip pan or the like. In the preferred embodiment, the hardware cloth layer 20 is about two inches longer and wider than the layers 22 and 24 and about an inch at each edge of the hardware cloth layer 20 is turned under the layers 22 and 24 to form a three layer package. The bottom of layer 24 is then sealed by a fourth layer 26 of 1/16" thick neoprene 26 and the rivets 14 and 16 are applied to secure the four layers together and to form the pockets for the structural channels 18. It will be noted that the rivets penetrate both the topmost surface of the hardware cloth layer 20 and the ends that have been turned in under the perforated neoprene layer 24, as shown in FIG. 2.

Figure 3:
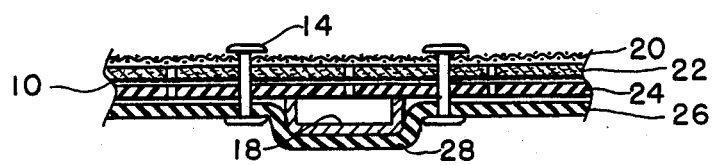
FIG. 3 is a sectional edge view taken along the lines 3—3 of FIG. 1.

FIG. 3 is a sectional view of the bib 10 taken along the lines 3—3 of FIG. 1 and illustrates the pocket 28 formed in the neoprene layer 26 for the channel 18 by the proper spacing of the rivets 14 through the bib 10. It is pointed out that the rivets 14 need only secure the various layers of the bib together; it is preferable that the rivets do not tightly bind the various layers since there should be some leakage space between the layers 22 and 24 for oil that may have passed through the perforations in the layer 22 to be absorbed at the bottom surface of that layer and between the layers 24 and 26 for the drainage of water from the bib.

What is claimed:

1. A multilayer oil absorbent engine bib for installation under a mechanical device for absorbing oil drips therefrom, said engine bib comprising:

a first layer of hardware cloth for providing mechanical strength to the engine bib, said first layer to be positioned facing the mechanical device and being the first layer to receive an oil drip;

a second layer adjacent said first layer, said second layer formed of a material that absorbs oil and oil based fuels and rejects water, said second layer having a plurality of small spaced holes for passage of non-absorbent fluids; and a third layer of a neoprene sheet adjacent said second layer, said neoprene sheet having a plurality of small spaced holes for passage of fluids not absorbed in said second layer.

2. The engine bib claimed in claim 1 wherein said first layer is larger in area than said second and third layers and extends around and under the edges of said second and third layers to secure said layers together.

3. The engine bib claimed in claim 2 further including a fourth layer of a neoprene sheet adjacent said third layer for sealing the engine bib against leakage through said fourth layer, non-absorbed fluids passing through said third layer being removed between said third and fourth neoprene sheets.

4. The engine bib claimed in claim 3 wherein said bib is rectangular in shape and wherein said four layers of said bib are secured together by rivets positioned along a plurality of spaced pairs of longitudinal rows, each of said pair of rows forming a longitudinal pocket between said third and fourth layers for slideably containing a structural member that may extend from the ends of the engine bib for lengthening said bib by attaching a second bib thereto.

* * * * *